United States Patent
Chen et al.

(10) Patent No.: US 9,733,679 B1
(45) Date of Patent: Aug. 15, 2017

(54) COMPONENT TRAY

(71) Applicant: Quanta Computer Inc., Taoyuan (TW)

(72) Inventors: Chao-Jung Chen, Taoyuan (TW); Yaw-Tzorng Tsorng, Taoyuan (TW); Chun Chang, Taoyuan (TW); Chen Tseng, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/097,654

(22) Filed: Apr. 13, 2016

(51) Int. Cl.
 *G06F 1/18* (2006.01)

(52) U.S. Cl.
 CPC ................... *G06F 1/187* (2013.01)

(58) Field of Classification Search
 CPC ....................................................... G06F 1/187
 See application file for complete search history.

(56) References Cited

U.S. PATENT DOCUMENTS

| | | | |
|---|---|---|---|
| 6,819,556 B2* | 11/2004 | Chen | G06F 1/184 |
| | | | 312/333 |
| 7,401,756 B2* | 7/2008 | Lien | H05K 7/1489 |
| | | | 220/559 |
| 9,367,082 B2* | 6/2016 | Jau | G06F 1/16 |
| 9,443,559 B2* | 9/2016 | Jau | G11B 33/022 |
| 2014/0211401 A1* | 7/2014 | Lee | G06F 1/187 |
| | | | 361/679.31 |
| 2015/0029656 A1* | 1/2015 | Lu | G11B 33/124 |
| | | | 361/679.39 |
| 2016/0044817 A1 | 2/2016 | Hsieh et al. | |

FOREIGN PATENT DOCUMENTS

| | | |
|---|---|---|
| CN | 200983434 Y | 11/2007 |
| TW | M308469 U | 3/2007 |
| TW | 201230016 A | 7/2012 |
| TW | M496831 U | 3/2015 |

OTHER PUBLICATIONS

Taiwanese Search Report for Application No. 105117033, dated Jan. 10, 2017.
Taiwanese Office Action for Application No. 105117033, dated Jan. 10, 2017, w/ First Office Action Summary.

* cited by examiner

*Primary Examiner* — Lisa Lea Edmonds
(74) *Attorney, Agent, or Firm* — Nixon Peabody LLP; Eduardo J. Quinones

(57) ABSTRACT

Hard drive tray having a bracket with a front surface, a bottom surface, and a sidewall forming a receiving space configured to receive a hard disk drive. At least one protrusion extends into the receiving space from the sidewall and is configured to engage the hard disk drive. A securing wire is coupled with the bottom surface opposite the sidewall and the securing wire has a securing end configured to be at least partially received within the hard disk drive, thereby securing the hard disk drive to the bracket.

20 Claims, 10 Drawing Sheets

COMPONENT TRAY

FIELD OF THE INVENTION

The present disclosure relates to component carriers, more specifically the present disclosure relates to a low profile hard drive tray.

BACKGROUND

Component carriers designed to secure components provide bulk and often prevent easy decoupling of the component from the component carrier. Component carriers have sidewalls forming a receiving space configured to receive the component.

SUMMARY OF THE INVENTION

A component carrier having a reduced profile with a single sidewall and implementing a securing wire disposed opposite the sidewall to secure the component within the component carrier. The securing wire can be pivotally received in the component, thereby securing the component within the component carrier. The securing wire has a securing end configured to be at least partially received within the component and the securing end can be substantially L-shaped. The securing wire can be pivotal approximately 90 degrees between a secured position and an unsecured position. A handle disposed on the securing wire can assist in transitioning the component carrier between the secured and unsecured positions. The handle can be substantially flush with the bottom surface of the component carrier in the secured position and extending away from the bottom surface of the component carrier in the unsecured position.

The component carrier can also implement a displaceable sidewall relative to the component carrier to further assist in receiving and securing the component within the component carrier.

The component carrier can include a support bracket coupling the securing wire with the bottom surface. The support bracket can be slidable relative to the bottom surface as the component carrier transitioned between a secured configuration and an unsecured configuration.

BRIEF DESCRIPTION OF THE DRAWINGS

Various embodiments in accordance with the present disclosure will be described with reference to the drawings, in which.

DETAILED DESCRIPTION

Figure 1:
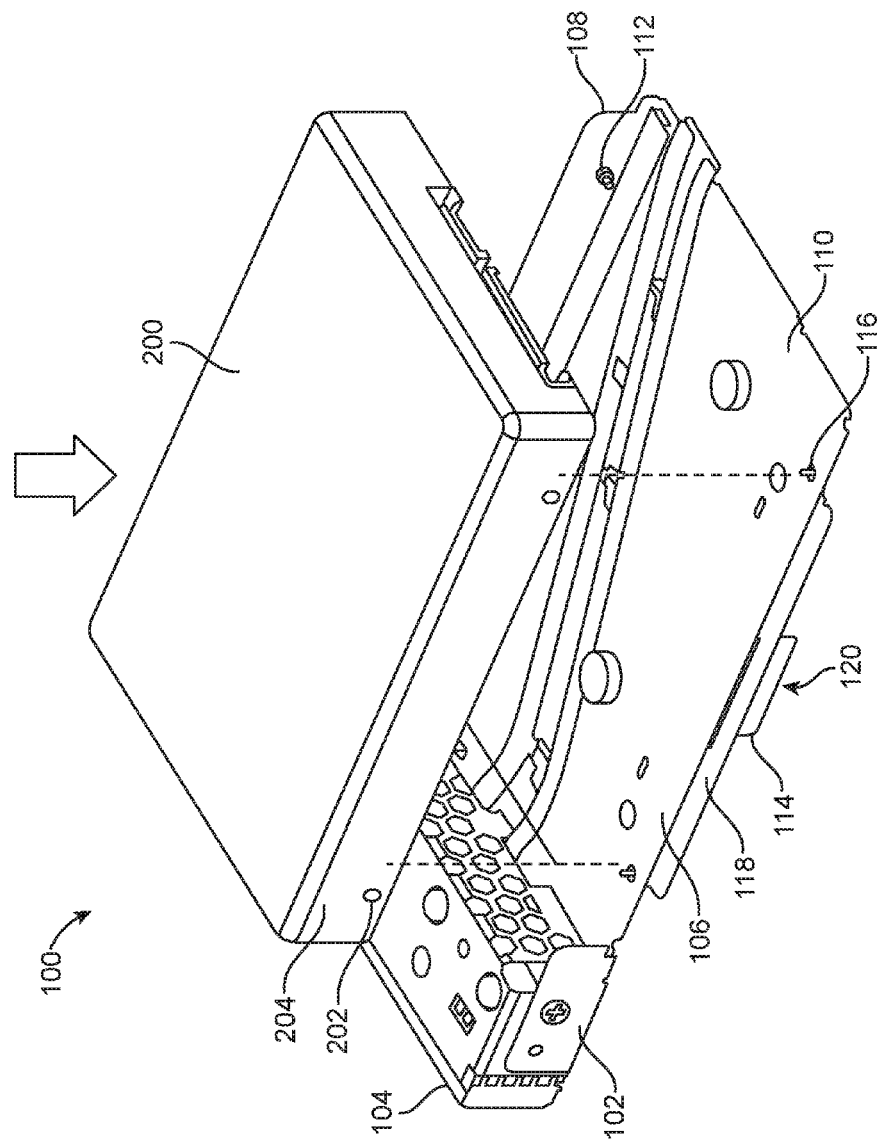
FIG. 1 is an exploded view of a component carrier and a received component in an unsecured position in accordance with an example embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure relates to a component carrier configured to receive and secure one more components, and more specifically a hard drive tray configured to receive and secure one or more hard disk drives. The hard drive tray has a bracket having a front surface, a bottom surface, and a sidewall forming a receiving space configured to receive a hard disk drive. At least one protrusion extends into the receiving space from the sidewall and is configured to engage the hard disk drive. A securing wire is coupled with the bottom surface of the hard drive tray and opposite the sidewall. The securing wire has a securing end configured to be at least partially received within the hard drive. The hard disk tray can be transitionable between an unsecured position and a secured position. In the unsecured position, the hard disk drive is decoupled from the bracket and removable from the hard disk tray. In the secured position, the hard disk drive is secured to the bracket by the securing wire and cannot be removed from the hard disk tray. While the specific embodiment is drawn to a hard drive tray configured to receive one or more hard drives, receiving a securing other components including, but not limited to, solid state drives, optical drives, power supplies, fans, or any other component of an electronic device is within the scope of this disclosure.

FIG. 1 illustrates a hard drive tray 100 having a bracket 102 with a front surface 104, bottom surface 106, and a sidewall 108 forming a receiving space 110. The receiving space 110 is configured to receive one or more components, such as a hard disk drive 200. The hard disk drive 200 can be received into and removed from the receiving space 110 in a substantially vertical direction. In other embodiments, the hard disk drive 200 can be received into and removed from the receiving space 110 in various directions depending on the arrangement of the front surface 104, bottom surface 106, and sidewall 108.

The front surface 104 can have electrical connections for engaging interfaces of hard disk drive 200, user interfaces, and power supplies. The bottom surface 106 can receive and support the hard disk drive 200. In at least one embodiment, the bottom surface 106 can have a plurality of holes formed therein for mounting the bracket 102 or providing airflow within the bracket 102 and cooling the hard disk drive 200. The sidewall 108 can have at least one protrusion 112 extending into the receiving space 110. The protrusion 112 is configured to engage a hole 202 formed on the corresponding sidewall 206 of the hard disk drive 200 when placed in the receiving space 110. The protrusion 112 can also assist in aligning the hard disk drive 200 within the receiving space 110.

The hard drive tray 100 also has a securing wire 114 disposed on the bottom surface 106 opposite the sidewall 108. The securing wire 114 has a securing end 116 that extends through the bottom surface 106 and into the receiving space 110. The securing end 116 is configured to be at least partially received within a hole 206 formed on a bottom surface 208 of the hard disk drive 200. The securing wire 114 is pivotal between an unsecured position and a secured position. In the unsecured position, the securing end 116 extends vertically into the receiving space 110 and is configured to align with the hole 206 formed on the bottom surface 208 of the hard disk drive 200. In the unsecured position, the hard disk drive 200 is receivable into and removable from the hard drive tray 100. In the secured position shown in FIG. 3, the securing end 116 is not aligned with the hole 206 formed on the bottom surface 208 of the hard disk drive 200 so as to prevent removal of the securing end 116 from the hole 206. The securing end 116 can have a variable shape so as to permit entry into the hole 206 and upon transitioning the securing wire 114, the variable shape of the securing end 116 prevents withdrawal from the hole 206. Thus, the hard disk drive 200 is secured to the bracket 102 and not removable from the hard drive tray 100. In the illustrated embodiment, the securing end 116 is substantially L-shaped and will be described with reference to FIGS. 4 and 5. In other embodiments, the securing end 116 can be a spiral shape, a V-shape, or any other variable shape so as you allow insertion of the securing end 116 into the hole 206 and upon transition prevent removal of the securing end 116 from the hole 206.

A support bracket 118 can be disposed between the securing wire 114 and the bottom surface 106 of the bracket 102. The support bracket 118 can be slidable relative to the bottom surface 106 providing additional engagement between the securing end 116 and the hole 206 formed on the bottom surface 208 of the hard disk drive 200.

The securing wire 114 can have a handle 120 formed thereon. The handle 120 can extend below the bottom surface 106 in the unsecured position and parallel to the bottom surface in the secured position. The handle 120 can assist in transitioning the securing wire 114 and the hard drive tray 100 between the secured position and the unsecured position. As can be appreciated in FIG. 1, the handle 120 can be a substantially U-shaped portion of the securing wire 114. In other embodiments, the handle 120 can be substantially V-shaped, or any other shape to assist transitioning the securing wire 114 between the unsecured position and the secured position.

Figure 2:
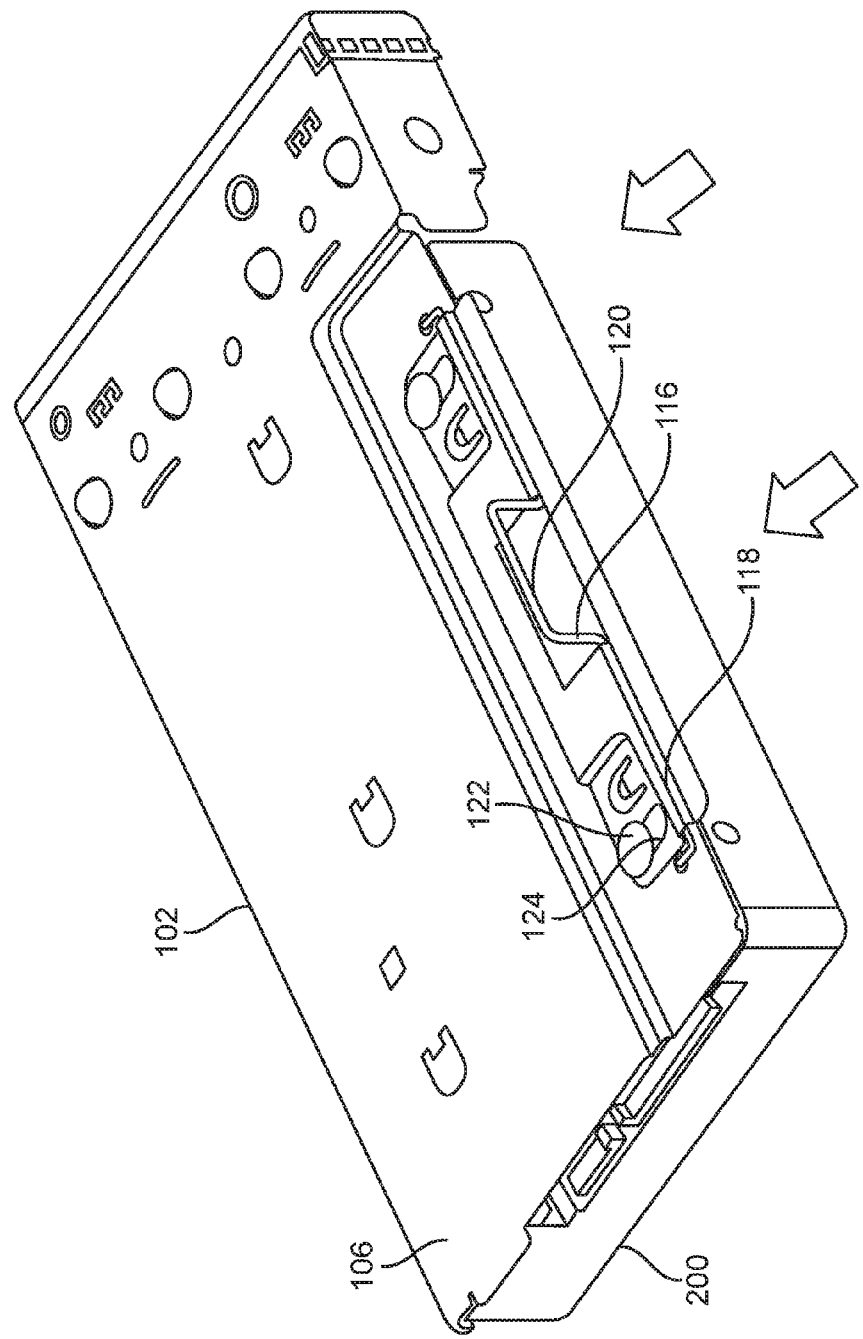
FIG. 2 is an isometric bottom view of a component carrier and a received component in an unsecured position in accordance with an example embodiment.

FIG. 2 illustrates the bottom surface 106 of a hard drive tray 100 showing the securing wire 114 and support bracket 118 in the unsecured position. The support bracket 118 is slidably coupled with the bottom surface 106 by two fasteners 122. The two fasteners 122 are received within a groove 124 formed on the support bracket 118 allowing the support bracket 118 to slide as the hard drive tray 100 is transitioned between the unsecured and secured positions. As can be appreciated in FIG. 2, in the unsecured position the handle 120 extends substantially perpendicular away from the bottom surface 106. The handle 120 can be transitioned from the unsecured position to the secured position by pivoting it toward the sidewall 108 until substantially flush with the bottom surface 106.

Figure 3:
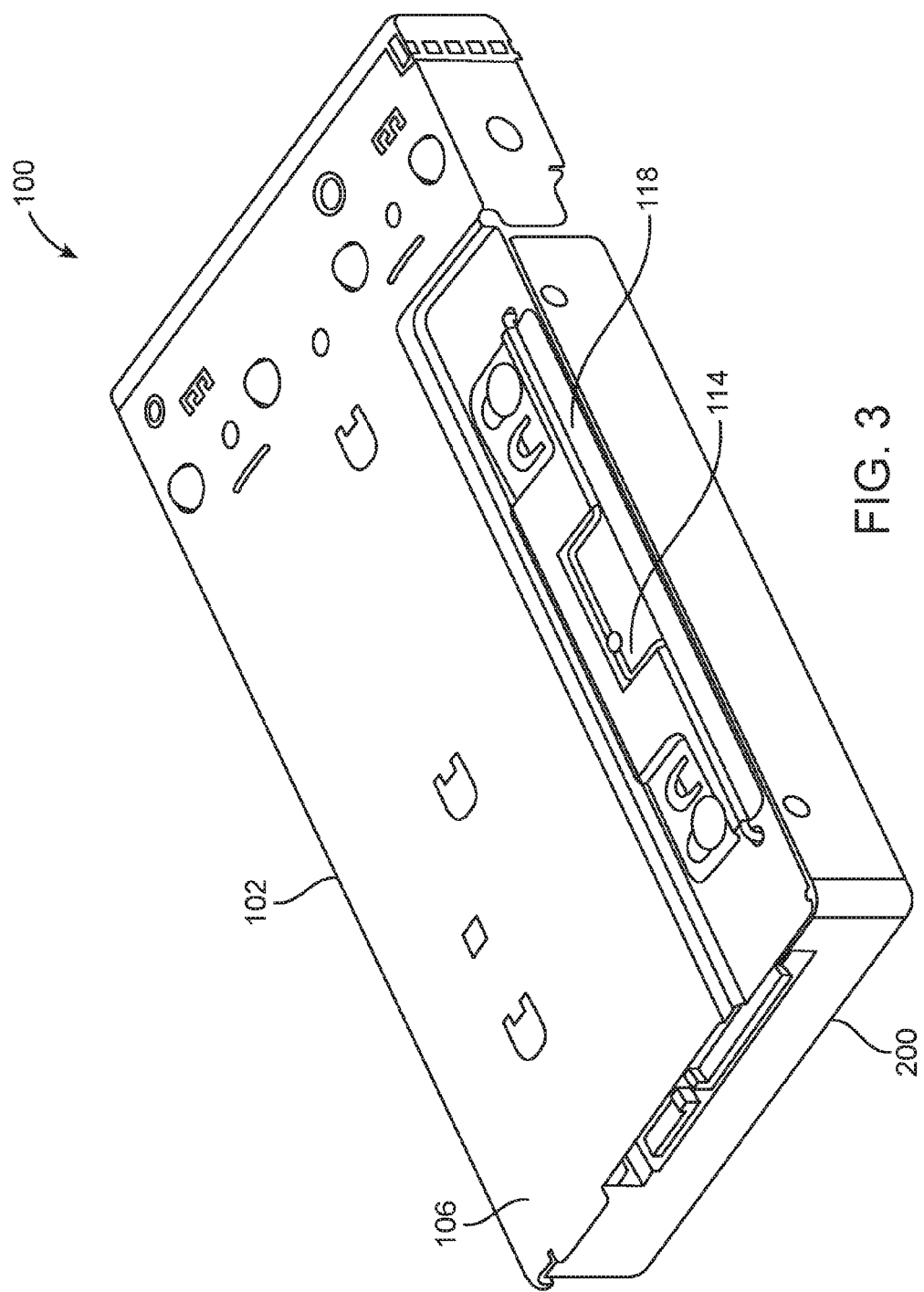
FIG. 3 is an isometric bottom view of a component carrier and a received component in a secured position in accordance with an example embodiment.

FIG. 3 illustrates the bottom surface 106 of a hard drive tray 100 showing the securing wire 114 and support bracket 118 in the secured position. The secured position prevents removal of the hard disk drive 200 from the bracket 102 of the hard disk tray 100. The handle 110 is substantially flush with the bottom surface 106 of the bracket 102 allowing insertion of the hard drive tray 100 into a server or other electronic device. The support bracket 118 can be slidingly displaced in the direction of toward the sidewall 106 to further engage the hard disk drive 200 with the bracket 102.

Figure 4:
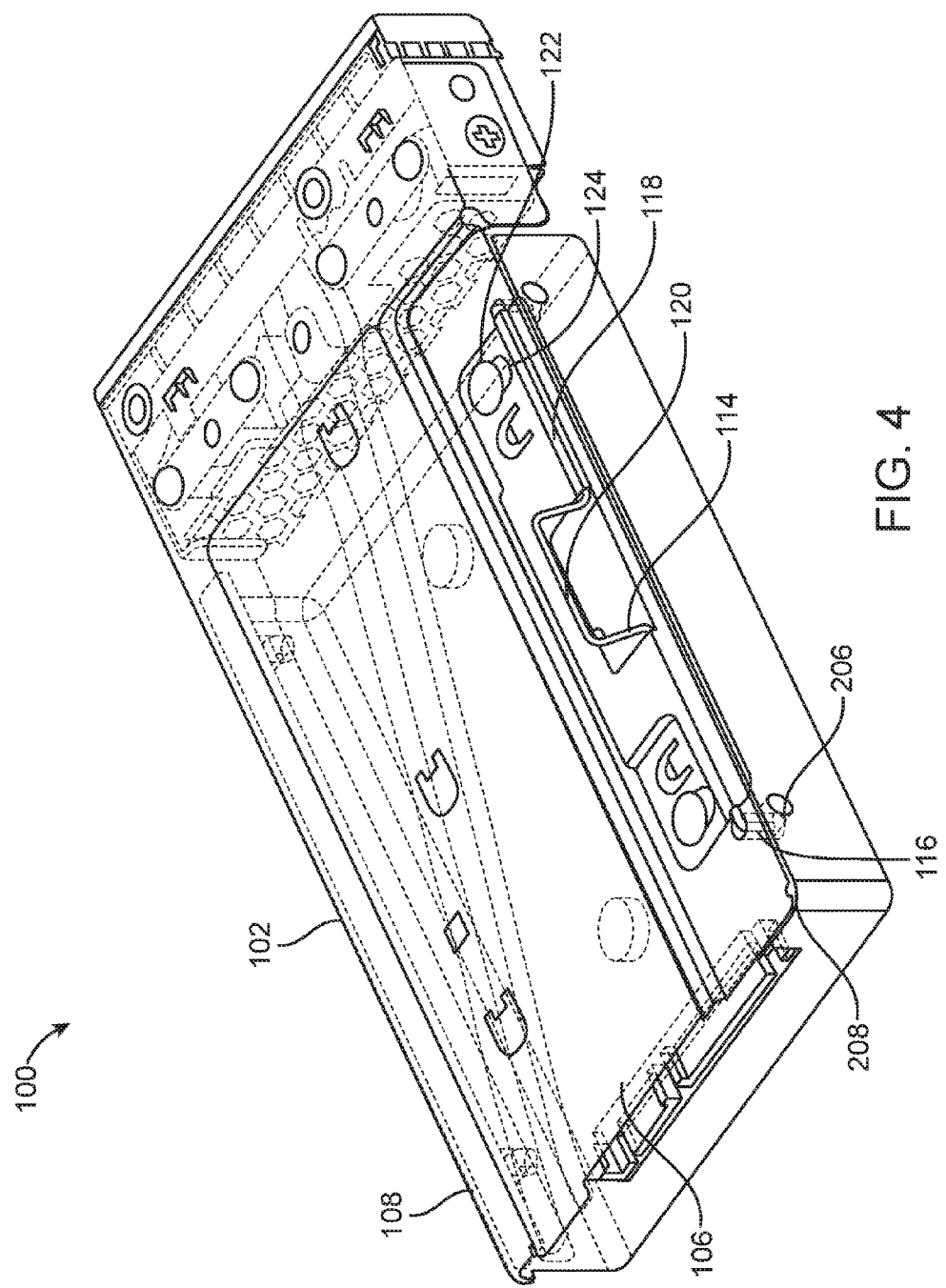
FIG. 4 is a isometric bottom view of a component carrier in a partially secured position.
Figure 5:
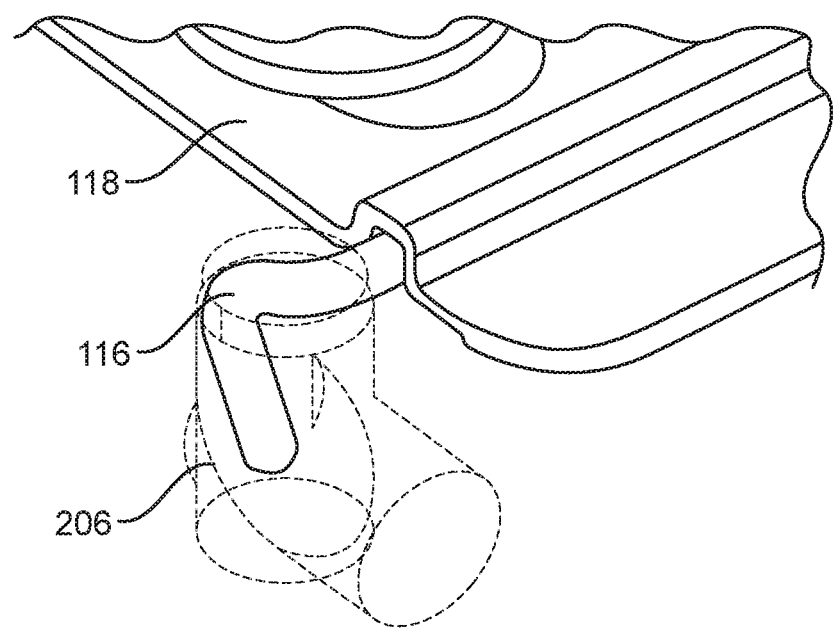
FIG. 5 is a detailed view of section A-A of FIG. 4.

FIGS. 4 and 5 illustrate a hard drive tray 100 in a partially secured position. As can be appreciated in FIGS. 4 and 5, the securing end 116 can be substantially L-shaped and configured to be vertically received into the hole 206 formed on the bottom surface 208 of the hard disk drive 200 in the unsecured position. As can further be appreciated in FIG. 5, the hole 206 can be a corresponding substantially L-shape to receive the securing end 116 of the securing wire 114. The hole 206 can be shaped to allow the securing end 116 to be received into and transition within the hole 206 while still providing securement of the hard disk drive 200 within the bracket 102. The rotation of the securing wire 114 from the unsecured position to the partially secured position displaces the support bracket 118. In at least one embodiment, the support bracket 118 is displaced approximately 2 millimeters.

Figure 6:
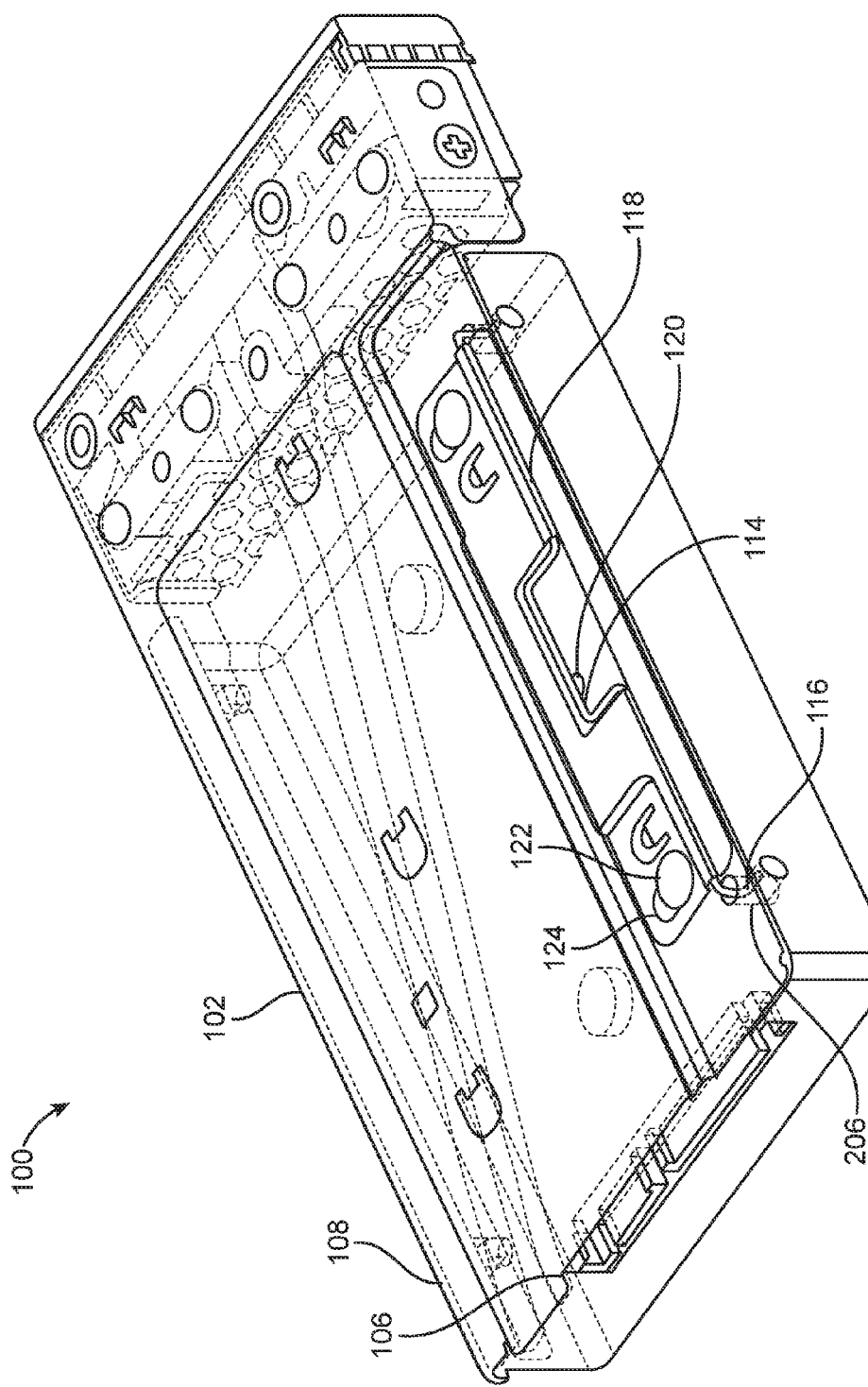
FIG. 6 is an isometric bottom view of a component carrier in a secured position.
Figure 7:
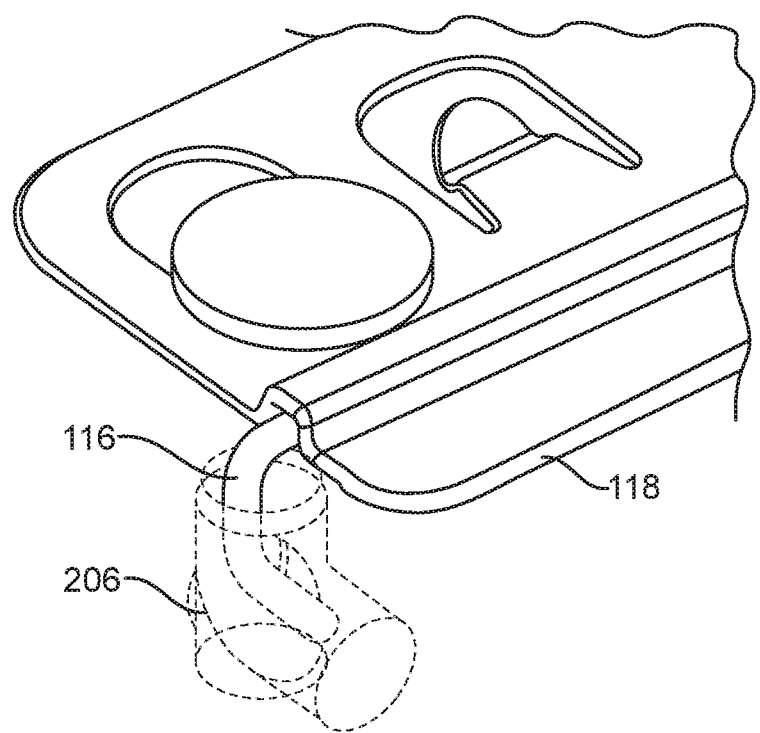
FIG. 7 is a detailed view of section B-B of FIG. 6.

FIGS. 6 and 7 illustrate a hard disk tray 100 in a secured position. As can be appreciated in FIGS. 6 and 7, the securing end 116 is pivoted to be substantially perpendicular to the entry of the hole 206 formed on the bottom surface 208 of the hard disk drive 200. The pivoting of the securing send 116 secures the hard disk drive 200 within the bracket 102 of the hard disk tray 100. In at least one embodiment, the support bracket 118 can be displaced approximately 4 millimeters from the unsecured position to the secured position. In other embodiments, the displacement of the support bracket 118 can be greater or less depending on the hard disk drive 200 and the arrangement of the securing wire 114 and hard disk tray 100. As can further be appreciated in FIG. 6, the handle 120 is parallel and substantially flush with the bottom surface 106 of the bracket 102 in the secured position.

Figure 8:
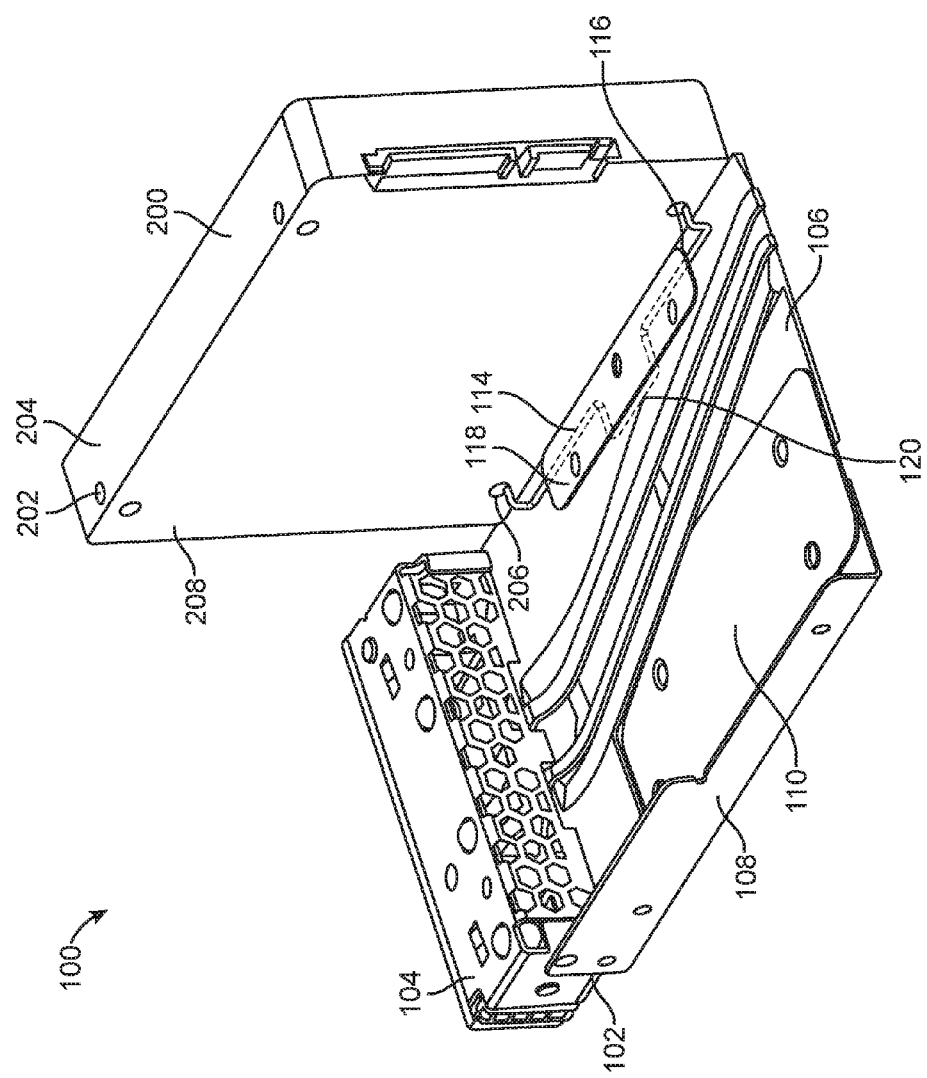
FIG. 8 is an isometric view of a component carrier receiving a component in accordance with a second embodiment.

FIG. 8 illustrates a second example embodiment of a hard disk tray 100 having a pivotal sidewall 108 receiving a hard disk drive 200. The sidewall 108 can be transitionable between and unsecured position and a secured position. In the unsecured position, the sidewall 108 is displaced away from the securing wire 114, thereby expanding the receiving space 110 and accepting the hard disk drive 200 into the receiving space 110. The sidewall 108 has one or more protrusions 112 formed thereon and extending into the receiving space 110. In the secured position, the sidewall 108 is displaced toward the securing wire 114 and engages the protrusions 112 with the hole 202 formed on the sidewall 204 of the hard disk drive 200.

The securing wire 114 can be fixed relative to the bottom surface 106 and the hard disk drive 200 can be received within the receiving space 110 by engaging the securing end 116 and pivoting the hard disk drive 200 into the receiving space 110. The securing end 116 can be substantially L-shaped and horizontally received into the hole 206 formed on the bottom surface 208 of the hard disk drive 200. The hard disk drive 200 is then pivoted toward the bottom surface 106 of the bracket 102 to engage the securing end 116 with the hard disk drive 200.

The hard disk drive 200 is secured to the bracket 102 so as to prevent lateral movement. The sidewall 108 is slid into engagement with the hard disk drive 200, such that the protrusions 112 are received into the corresponding hole 202 on the sidewall 204 of the hard disk drive 200. The displacement of the sidewall 108 toward the hard disk drive 200 and the engagement of the protrusions 112 within the hole 202 prevents vertical movement of the hard disk drive. The hard disk drive 200 cannot be removed from the bracket 102 when in the secured position.

In other embodiments, the sidewall 108 can be pivotally coupled with the front surface 104 and/or the bottom surface 106.

Figure 9:
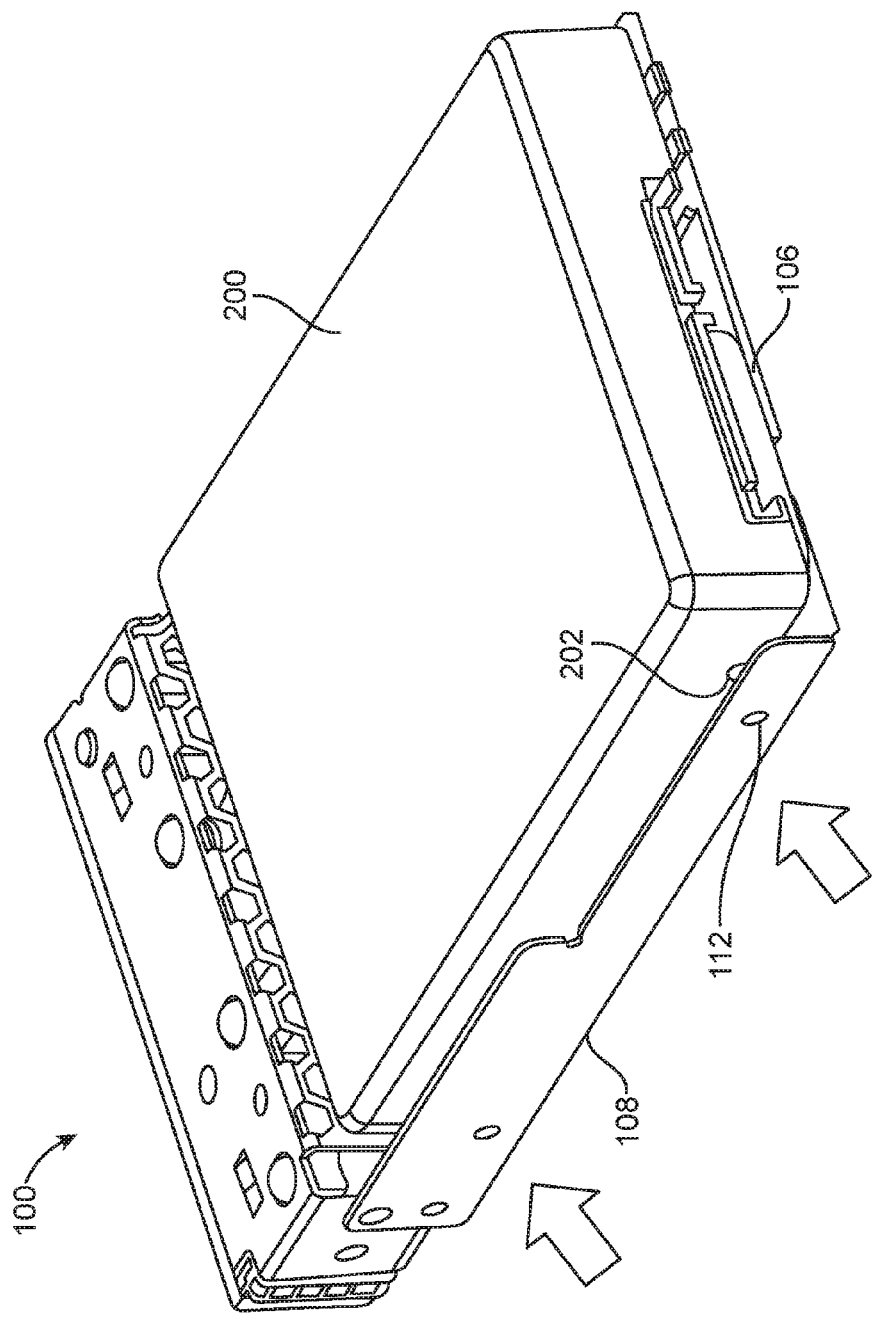
FIG. 9 is an isometric view of a component carrier and a received component in an unsecured position in accordance with a second embodiment.
Figure 10:
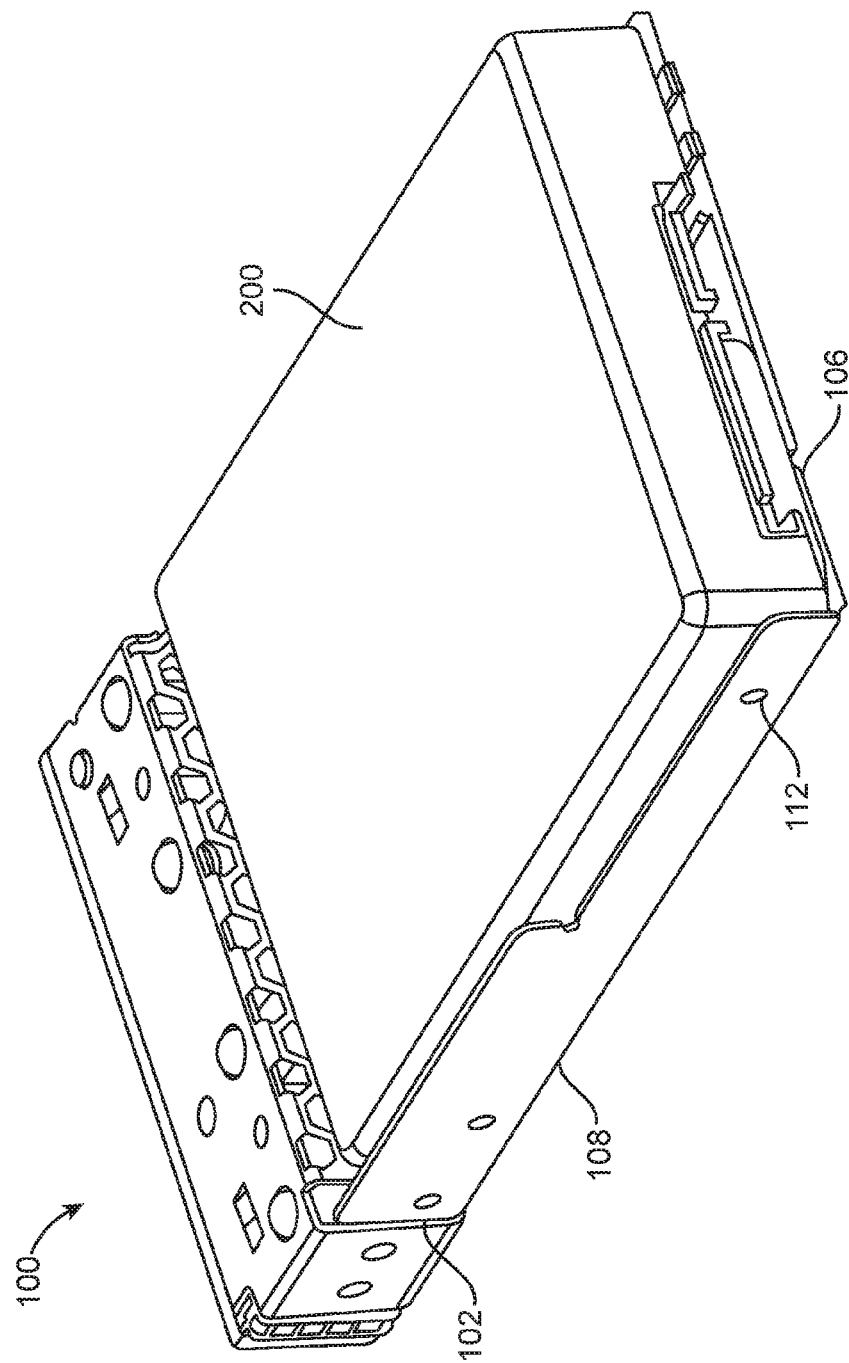
FIG. 10 is an isometric view of a component carrier and a received component in a secured position in accordance with a second embodiment.

While the hard disk tray 100 of FIGS. 1-7 is described as a first embodiment and the hard disk tray 100 of FIGS. 8-10 is described as a second embodiment, it is within the scope of this disclosure to implement the respective securing elements in a single embodiment. The hard disk tray 100 can implement a pivoting securing wire 114 of FIGS. 1-7 in combination with the sliding sidewall 108 of FIGS. 8-10. The pivotal securing wire 114 and the sliding sidewall 108 can generate two securing mechanisms within the hard disk tray 100, thereby further securing the hard disk drive 200 with the bracket 102.

FIG. 9 illustrates a hard drive tray 100 in an unsecured position and having a hard disk drive 200 received into the receiving space 110. The sidewall 108 can be displaced toward the securing wire 114 to engage the sidewall 204 of the hard disk drive 200. Pushing the sidewall 108 toward the securing wire 114 displaces the sidewall 108 relative to the bottom surface 106, thereby reducing the receiving space 110 and securing the hard disk drive 200. In at least one embodiment, the sidewall 108 is coupled with the bottom surface 106 similar to the support bracket 118 as shown in FIGS. 2 and 3. The bottom surface 106 and/or the front surface 104 can have a latching surface 126 to secure the sidewall 108 in the secured position and prevent accidental release of the hard disk drive 200 from the bracket 102

FIG. 10 illustrates a hard drive tray 100 in a secured position and having a hard disk drive 200 secured in the receiving space 110. The sidewall 108 is displaced such that is adjacent to the sidewall 204 of the hard disk drive 200. The protrusions 112 extending from the sidewall 108 into the receiving space 110 engage the hard disk drive 200, thereby securing the hard disk drive 200 within hard drive tray 100.

While the illustrated embodiment is drawn to a securing wire 114 disposed opposite the sidewall 108, in other embodiments the securing wire 114 can be disposed on a back edge of the bottom surface 106. The securing wire 114 can be pivotal along the back edge, or the sidewall 108 can slide to engage the hard disk drive.

It is believed the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiments of the disclosure.

What is claimed is:

1. A hard drive tray comprising:
   a bracket having a front surface, a bottom surface, and a sidewall forming a receiving space configured to receive a hard disk drive;
   at least one protrusion extending into the receiving space from the sidewall and configured to engage the hard disk drive; and
   a securing wire coupled with the bottom surface opposite the sidewall;
   wherein the securing wire has a securing end configured to be at least partially received within the hard disk drive, thereby securing the hard disk drive to the bracket.

2. The hard disk tray of claim 1, wherein the bracket includes a support bracket coupling the securing wire with the bottom surface, the support bracket slidable relative to the bottom surface.

3. The hard disk tray of claim 1, wherein the securing wire is pivotal between a secured position and an unsecured position, in the secured position the hard disk drive secured to the bracket and in the unsecured position the hard disk drive is removable from the bracket.

4. The hard disk tray of claim 3, wherein the securing wire pivots approximately 90 degrees between the secured position and the unsecured position.

5. The hard disk tray of claim 3, wherein the securing end is substantially L-shaped and configured to be vertically received into the hard disk drive in an unsecured position and pivoted to be substantially horizontal in the secured position.

6. The hard disk tray of claim 3, wherein the securing wire has a handle portion that extends below the bottom surface in the unsecured position, and is parallel to the bottom surface in the secured position.

7. The hard disk tray of claim 1, wherein the sidewall is slidably engaged with the bottom surface.

8. The hard disk tray of claim 1, wherein the sidewall is pivotally engaged with the bottom surface.

9. The hard disk tray of claim 1, wherein the sidewall is pivotally engaged with the front surface.

10. The hard disk tray of claim 1, wherein the bracket is open opposite the front surface and opposite the sidewall.

11. A hard drive tray comprising:
    a bracket having a front surface, a bottom surface, and a sidewall forming a receiving space configured to receive a hard disk drive;
    at least one protrusion extending into the receiving space from the sidewall and configured to engage the hard disk drive; and
    a securing wire pivotally coupled with the bottom surface opposite the sidewall;

wherein the securing wire has a securing end configured to be at least partially received within the hard disk drive;

wherein the securing wire is pivotal between a secured position and an unsecured position, in the secured position the hard disk drive secured to the bracket and in the unsecured position the hard disk drive is removable from the bracket.

12. The hard disk tray of claim 11, wherein the bracket includes a support bracket coupling the securing wire with the bottom surface, the support bracket slidable relative to the bottom surface.

13. The hard disk tray of claim 11, wherein the securing wire pivots approximately 90 degrees between the secured position and the unsecured position.

14. The hard disk tray of claim 11, wherein the securing end is substantially L-shaped and configured to be vertically received into the hard disk drive in an unsecured position and pivoted to be substantially horizontal in the secured position.

15. The hard disk tray of claim 11, wherein the securing wire has a handle portion that extends below the bottom surface in the unsecured position, and is parallel to the bottom surface in the secured position.

16. A hard drive tray comprising:
a bracket having a front surface, a bottom surface, and a sidewall forming a receiving space configured to receive a hard disk drive;
at least one protrusion extending into the receiving space from the sidewall and configured to engage the hard disk drive; and
a securing wire coupled with the bottom surface opposite the sidewall;
wherein the securing wire has a securing end configured to be at least partially received within the hard disk drive, thereby securing the hard disk drive to the bracket;
wherein the sidewall is slidably engaged with the bottom surface.

17. The hard disk tray of claim 16, wherein the bracket includes a support bracket coupling the securing wire with the bottom surface, the support bracket slidable relative to the bottom surface.

18. The hard disk tray of claim 16, wherein the sidewall is pivotally engaged with the bottom surface.

19. The hard disk tray of claim 16, wherein the sidewall is pivotally engaged with the front surface.

20. The hard disk tray of claim 16, wherein the bracket is open opposite the front surface and opposite the sidewall.

* * * * *